(12) United States Patent
McCrady et al.

(10) Patent No.: US 6,901,405 B1
(45) Date of Patent: May 31, 2005

(54) METHOD FOR PERSISTING A SCHEDULE AND DATABASE SCHEMA

(75) Inventors: Donald J. McCrady, Redmond, WA (US); Amit Mital, Kirkland, WA (US); A. S. Sivakumar, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 464 days.

(21) Appl. No.: 09/741,222

(22) Filed: Dec. 20, 2000

(51) Int. Cl.[7] .............................................. G06F 17/30
(52) U.S. Cl. ...................... 707/102; 707/100; 707/203; 709/102
(58) Field of Search ................................ 707/100, 101, 707/201, 102, 203; 709/203

(56) References Cited

U.S. PATENT DOCUMENTS

| | | | |
|---|---|---|---|
| 5,261,069 A | | 11/1993 | Wilkinson et al. ........... 711/145 |
| 5,524,241 A | | 6/1996 | Ghoneimy et al. ............ 707/10 |
| 5,581,691 A | | 12/1996 | Hsu et al. ...................... 714/15 |
| 5,630,069 A | | 5/1997 | Flores et al. .................... 705/7 |
| 5,706,429 A | | 1/1998 | Lai et al. ...................... 709/230 |
| 5,857,195 A | * | 1/1999 | Hayashi et al. .............. 707/102 |
| 5,862,327 A | * | 1/1999 | Kwang et al. ................ 709/203 |
| 5,918,218 A | | 6/1999 | Harris et al. ................... 705/37 |
| 5,940,839 A | | 8/1999 | Chen et al. ................... 707/202 |
| 5,960,420 A | | 9/1999 | Leymann et al. ............... 707/1 |
| 6,009,405 A | | 12/1999 | Leymann et al. ............... 705/9 |
| 6,199,068 B1 | * | 3/2001 | Carpenter .................... 707/100 |
| 6,446,089 B1 | * | 9/2002 | Brodersen et al. ........... 707/201 |
| 6,496,831 B1 | * | 12/2002 | Baulier et al. ............... 707/101 |

* cited by examiner

*Primary Examiner*—Charles L. Rones
*Assistant Examiner*—Hassan Mahmoudi
(74) *Attorney, Agent, or Firm*—Amin, Eschweiler & Turocy, LLP

(57) ABSTRACT

The invention provides a database schema for representing a workflow process definition (e.g., a schedule). The database schema may also include one or more bindings associated with the schedule, as well as persisted state information and data. The invention further includes a method for storing schedule information in a storage medium, as well as a computer-readable medium having a data structure stored thereon. The storage of schedule-related information provides for ease of version control, and ease of distribution, for example, where several engines point to the same database as a single source of transaction processing or workflow schedule definitions. The definitional database schema may be advantageously employed to reconstruct the schedule definition language solely from information in a database. In addition, the schema may be used for storing instances of running schedules and data associated therewith. This allows ease of schedule state and data monitoring using existing database query tools.

30 Claims, 10 Drawing Sheets

METHOD FOR PERSISTING A SCHEDULE AND DATABASE SCHEMA

TECHNICAL FIELD

The present invention relates to transaction processing in computer systems. More particularly, the invention relates to a method for storing and monitoring a transaction schedule and information related thereto in a database, and a database schema therefor.

BACKGROUND OF THE INVENTION

Schedules are applications which may be defined for transaction processing systems, such as computer systems. A schedule instance may be executed in such a system, whereby one or more transactions within the schedule are executed. In executing an instance of such a schedule and its component transactions, information associated therewith may need to be stored or persisted in a storage medium, such as a memory system.

Storage of information in a storage medium may be facilitated using a database in conjunction with a database management system (DBMS). A database is a collection of related data that may be stored on a nonvolatile memory medium. Data in the database is commonly organized in a two-dimensional row and column form called a table. A database typically includes multiple tables.

A table is an object in the database having at least one record and at least one field within each record. Thus, a table may be thought of as an object having two-dimensional record and field organization. A record is a row of data in the table that is identified by a unique numeric called a record number. A field is a subdivision of a record to the extent that a column of data in the table represents the same field for each record in the table. Each field in a record is identified by a unique field name and a field name remains the same for the same field in each record of the table. Therefore, a specific datum in a table is referenced by identifying a record number and a field name.

A database management system (DBMS) is a control system that supports database features including, but not limited to, storing data on a memory medium, and retrieving data from the memory medium. Data in the database is typically organized among a plurality of objects that include, but are not limited to, tables and queries. An individual table or query may be referred to as a record source because it is a source of data or records from the database. A query object is an executable database interrogation statement, command, and/or instruction that communicates to the database management system the identity and location of data being extracted from the database. The product of an executed query is called a result set. A result set may be stored and/or manipulated as a two-dimensional object similar to the table discussed previously.

A relational database is a common database type managed by a database management system. Data in a relational database is distributed among multiple record sources that are typically related, or normalized, in a manner designed to minimize redundant data in the database, minimize the space required to store data in the database, and maximize data accessibility. Record sources in a database may be related to one another via key fields. A normalized database is one where each record source in the database is directly related to at least one other record source in the rd same database by key fields.

A key field can be a primary key or a foreign key. A primary key is a field or combination of fields in a record source that includes unique data for each record in the table. A foreign key is any non-primary key in a record source that is the basis for a direct relation with any other record source. A database remains a relational database regardless of the degree of normalization that exists. Record sources in a normalized relational database are typically related. However, a relational database may be normalized even if the database is disconnected in that at least one record source in the database is not related to any other record source by a key field.

Relationships between any two record sources in a relational database may be either direct or indirect. Such a relationship may also be referred to as a relation or join. A direct relationship exists between two record sources if there is no intervening record source in the relationship path therebetween. An indirect relationship exists if there is at least one intervening record source in the relationship path between two record sources.

The record sources in a relational database and the relationships therebetween define the geography of a database, which may be called a database schema. A sub-schema of the database is any subset of the full database schema that is defined by a query, a result set of a query, or any other subset of record sources from the database. A database schema and database sub-schema may be displayed visually in graphic form as a graph having edges or arrows representing relationships between record sources, and vertices, also known as nodes or tables, representing the record sources at either end of a relationship.

Queries are used to access data in a database. A query may be constructed in a Structured Query Language (SQL) that may or may not be based on the American National Standards Institute (ANSI) standard SQL definition. To access data in a database, a user may construct a query using an SQL. Executing a query is called a join or joining wherein each relation identified in the query is joined during execution to retrieve the desired data from a database.

Schedule-related information comprises many diverse types of data. Prior transaction processing systems do not provide an effective mechanism for the storage any retrieval of such schedule-related information and data to and from a storage medium, such as a database. It is desirable to store information relating to a schedule definition in an efficient manner where the specifics of the definitional language may be easily reconstructed solely from information in a database. At the same time, updates to the database with runtime information may need to be fast, possibly at the expense of storage efficiency. Thus, fully normalized database structures are not an optimal match for the requirements of schedule information storage. In addition, schedule-related information may include binding information. One or more bindings may be associated with a schedule, to allow instances of a single schedule to be executed on different machines or systems with different hardware technologies. Conventional database structures and schemas do not provide efficient, easily-portable storage solutions for schedule-related information storage. Moreover, current schedule storage methods and systems do not provide for ease of querying and monitoring schedule-related information and data.

SUMMARY OF THE INVENTION

The present invention relates to a first (e.g., definitional) database schema for representing a process definition (e.g., a schedule), and a second (e.g., runtime) schema for representing the process definition, one or more bindings associated therewith, and persisted state information and data. The invention further includes a method for storing schedule information and/or data associated therewith in a storage medium, as well as a computer-readable medium having a data structure stored thereon. Database storage of the process definition information allows for ease of version control, and ease of distribution, for example, where several runtime engines or systems point to the same database as a single source of definitions. The table or tables in the database schema corresponding to the process definition include class level information. In this regard, the definitional database schema may be advantageously employed to reconstruct the schedule definition language solely from information in a database.

In addition to the definitional information, the second (e.g., runtime) schema may be used for storing instances of running schedules. The schema accordingly includes one or more tables related to instance information. The instance tables may comprise, for example, information describing what instances of a schedule are running and what definitions they correspond to, as well as positional information, such as what actions are currently live, how many messages are currently pending, and other schedule state information. Moreover, the schedule definition and binding information portions or tables of the schema may be normalized to a higher degree than are those relating to runtime information. In this way, an efficient storage methodology and system are provided for less frequently accessed tables (e.g., tables related to schedule definition and binding information), while fast access is provided to runtime information. Thus, the invention provides for optimal storage or persistence of the diverse types of schedule-related information.

The runtime database schema may also include data associated with one or more schedule instances. This data may include the value of specific messages, etc. For example, the schedule state information and data may be persisted to the database during execution at transaction boundaries. Schedule data and state information may also be persisted to the database during dehydration operations based on latency hints or attributes. The database schema provides a format for storing the persisted information in a relational database for ease of access and monitoring by a user.

The runtime schema may be fixed, thus allowing the use of monitoring and other tools to query against the database. Such database queries may be employed to indicate the status of a running workflow process, how specific instances of the process are running, (e.g., for each instance of the process, the current position in the schedule, etc.), and the data associated therewith. The ability to use common tools for obtaining this information is enabled by the use of overlapping schemas for definitional purposes and to describe runtime instances and information associated therewith.

The runtime schema may be a superset of the definitional schema, including all the information therefrom, as well as the instance related tables and runtime data tables. Because the runtime schema includes both static definitional information, as well as instance information (which may be accessed frequently), these different portions of the schema may be normalized differently. Accordingly, the definitional information may be normalized to minimize storage space requirements by reducing redundant information storage, whereas the instance information may be normalized to a lesser degree (or not at all) to allow for fast access thereto. This flexibility in normalization provides for runtime efficiency when data and state information is persisted to disk, for example, where persistence at transaction boundaries, and/or dehydration (and rehydration) are employed.

In accordance with one aspect of the invention, there is provided a database schema for storage of process information in a database, comprising a table representing process definition information derived from a process definition language representation of a process.

In accordance with another aspect of the invention, there is provided a database schema for storage of process information in a database. The database schema comprises a definitional element with at least one definition table for storing a process definition, and a runtime element with at least one instance table for storing instance information and at least one data table for storing runtime data.

In accordance with yet another aspect of the present invention, there is provided a method for storing process information in a database. The method comprises providing a database schema, having a definitional element with a definition table for storing a process definition, and a runtime element with at least one instance table for storing instance information and at least one data table for storing runtime data. The method further comprises storing a process definition in the database according to the definition table, storing instance information in the database according to the instance table, and storing runtime data in the database according to the data table. Another aspect of the invention provides for a computer-readable medium having computer-executable instructions for carrying out the steps of the above method.

In accordance with still another aspect of the invention, there is provided a computer-readable medium having stored thereon a data structure. The data structure comprises a first data component with data representing a definition of a process, a second data component with data representing instance information relating to one or more instances of the process, and a third data component with data representing runtime data relating to the process. The data structure thus includes all aspects of a schedule, including the schedule definition elements, and runtime elements. This data structure allows for efficient recreation of definitional language representations of the schedule, and monitoring of schedule status information and data using existing database query tools.

In accordance with yet another aspect of the invention, there is provided a method of monitoring a schedule having schedule-related information associated therewith. The method comprises querying a database having schedule-related information stored therein according to a schema to obtain a result set, wherein the schema comprises a definitional element with at least one definition table for storing a process definition, and a runtime element with at least one instance table for storing instance information and at least one data table for storing runtime data. The result set may comprise at least a portion of the schedule-related information. The method may further comprise providing the result set to a monitoring device, and monitoring the result set via the monitoring device. The invention thus enables a user to monitor the progress of one or more instances of a schedule using existing database query tools, which is advantageous in diagnostic and troubleshooting applications. According to another aspect of the invention, the method may further include storing schedule-related information in the database according to the database schema. In addition, the invention includes a computer-readable medium having computer-executable instructions for performing the above methodology.

To the accomplishment of the foregoing and related ends, the invention comprises the features hereinafter fully described and particularly pointed out in the claims. The following description and the annexed drawings set forth in detail certain illustrative aspects of the invention. The illustrations and description below are indicative, however of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

The foregoing and other aspects of the invention will become apparent from the following detailed description of the invention and the attached drawings in which.

DETAILED DESCRIPTION OF THE INVENTION

Figure 1A:
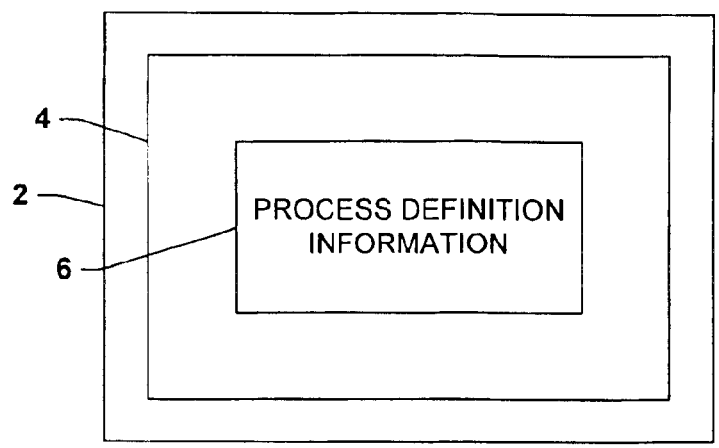
FIG. 1A is a schematic diagram illustrating an exemplary database schema in accordance with an aspect of the present invention.

The following is a detailed description of the present invention made in conjunction with the attached figures, wherein like reference numerals will refer to like elements throughout. According to one aspect of the invention, a database schema is provided, having a definitional element or component with at least one table representing process definition information derived from a process definition language representation of a process. The schema may further comprise a runtime element with at least one instance table for storing instance information and at least one data table for storing runtime data.

FIG. 1A illustrates one exemplary database schema 2 for storage of process information in a database (not shown) in accordance with the invention. The schema 2 includes a table 4 having process definition information 6 therein. A user may advantageously extract or reconstruct a definitional language representation of a schedule or other process from the process definition information 6 in the database.

Figure 1B:
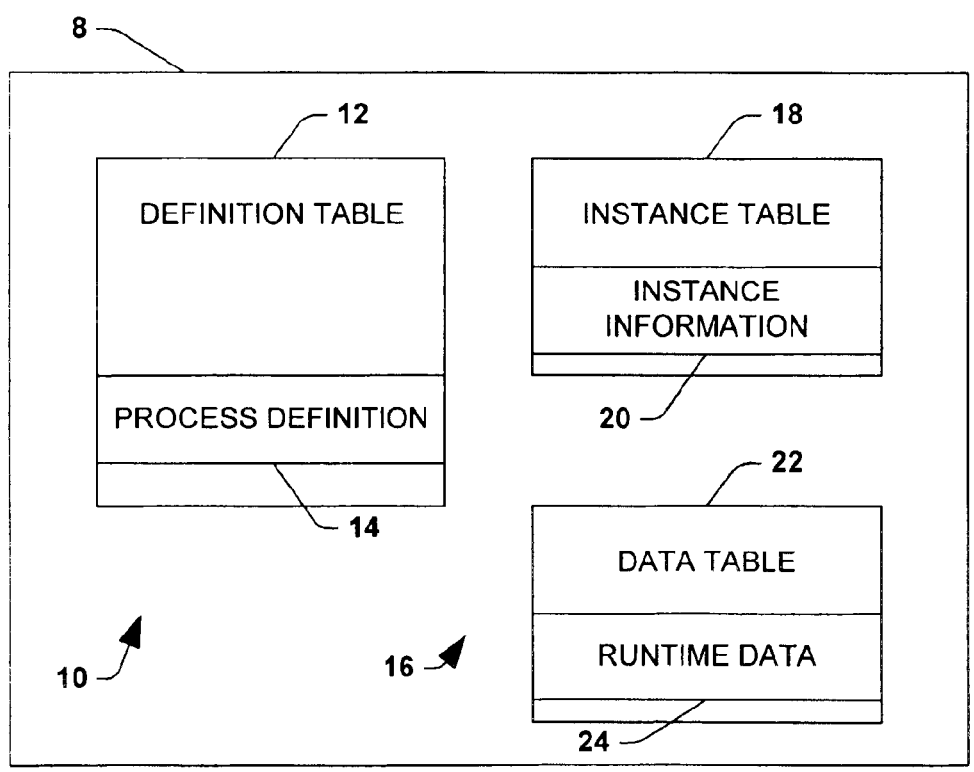
FIG. 1B is a schematic diagram illustrating another exemplary database schema in accordance with the invention.

Another exemplary database schema 8 is illustrated in FIG. 1B, which may be a superset of the schema 2 of FIG. 1A. Schema 8 comprises a definitional element 10 with at least one definition table 12 for storing a process definition 14. Like the database schema 2 of FIG. 1A, the process definition 14 may be employed to extract or reconstruct a definitional language representation of a schedule or other process. The schema 8 further comprises a runtime element 16 with at least one instance table 18 for storing instance information 20, as well as at least one data table 22 for storing runtime data 24.

The exemplary schemas 2 and 8 of FIGS. 1A and 1B provide a complete definition of a transaction processing or workflow schedule. Thus, it is possible to reconstruct the schedule definition language representation of a schedule solely from the information in the database. The schema 8, moreover, provides a data structure (e.g., runtime element 16) for storing and managing runtime data 24 related to one or more instances of a schedule in a database. The runtime information or data 24 may comprise, for example, schedule state information, data, and/or messages (not shown) associated with a running schedule application. This runtime data 24 may be accessed using existing database query tools and database management systems (DBMSs) to provide a user with status and/or data associated with one or more processes. This allows users to easily monitor schedule execution progress, which is advantageous in diagnostic or debugging situations.

FIGS. 2A–2F graphically illustrate another exemplary database schema 28 in accordance with the invention. The schema 28 comprises various tables and relationships therebetween, as described hereinafter. The various tables of database schema 28 are described now, after which the fields within the tables and the relationships between tables are discussed.

Schema Tables

Figure 2A:
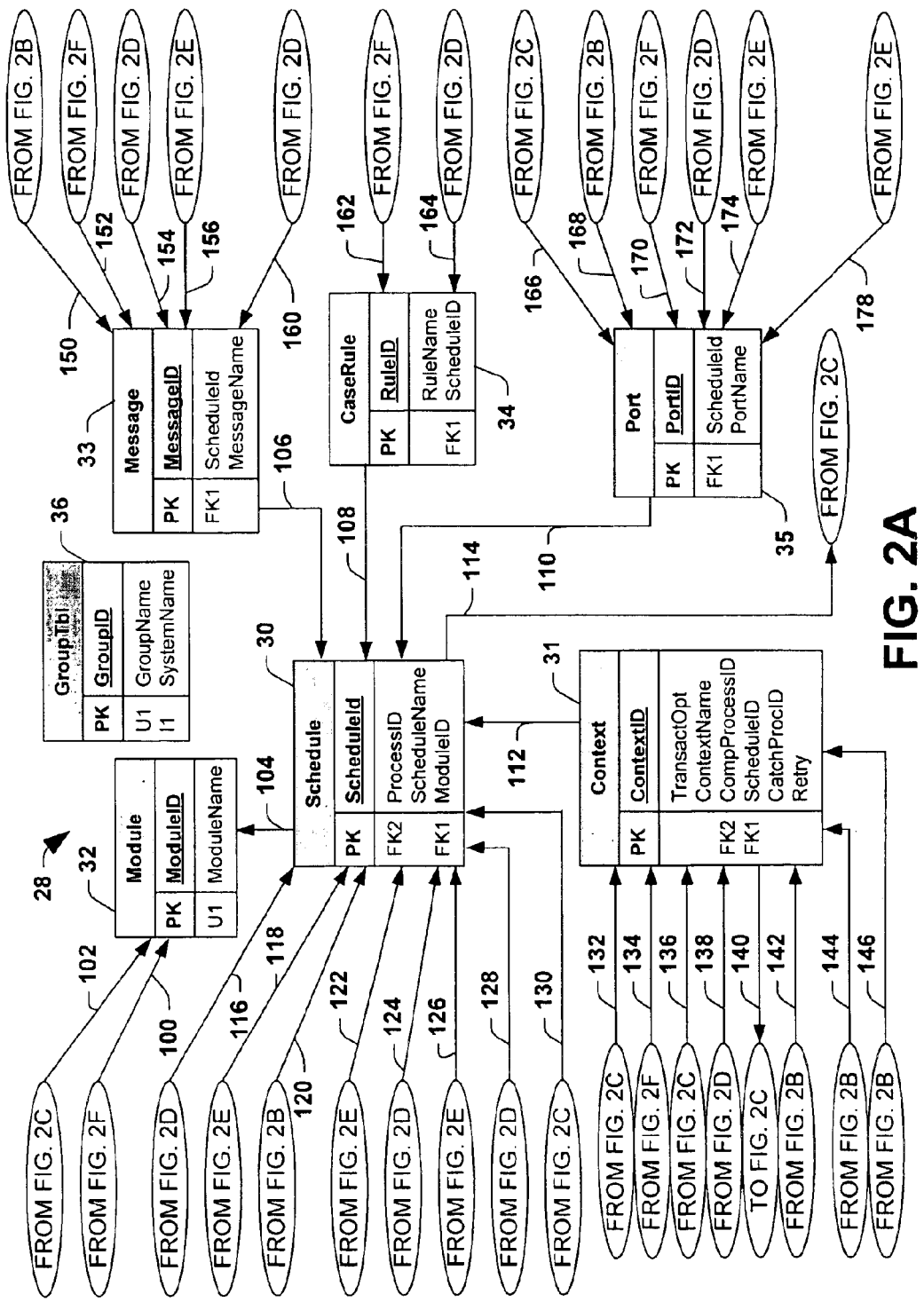
FIG. 2A is a schematic diagram illustrating yet another exemplary database schema in accordance with the invention.
Figure 2B:
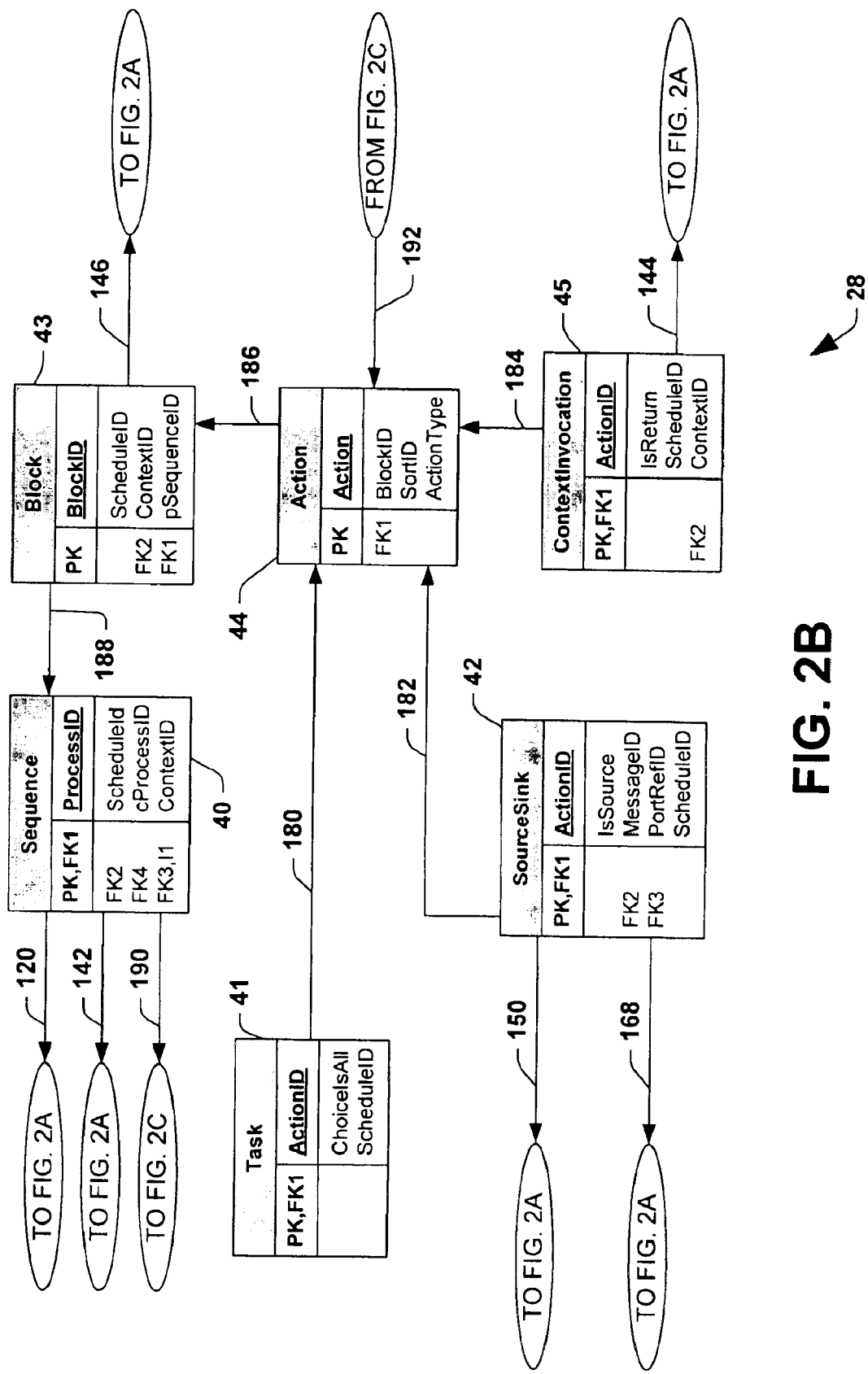
FIG. 2B is a schematic diagram further illustrating the exemplary database schema of FIG. 2A.

FIG. 2A illustrates a portion of schema 28 having a Schedule table 30, a Context Table 31, a Module table 32, a Message table 33, a Case Rule table 34, a Port table 35, and a GroupTbl table 36. Referring also to FIG. 2B, the database schema 28 further comprises a Sequence table 40, a Task table 41, a SourceSink table 42, a Block table 43, an Action table 44, and a ContextInvocation table 45.

Figure 2C:
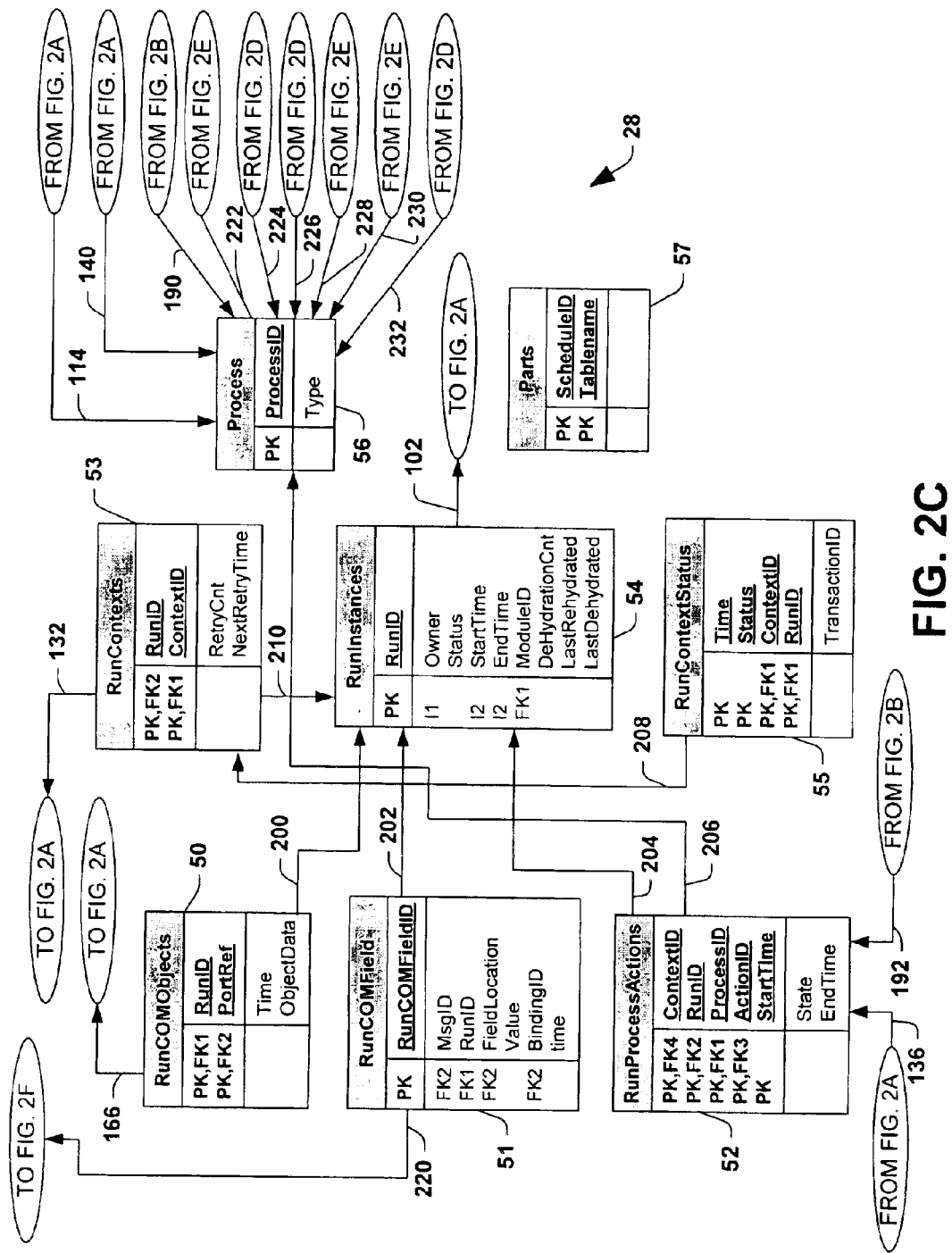
FIG. 2C is a schematic diagram further illustrating the exemplary database schema of FIGS. 2A–2B.
Figure 2D:
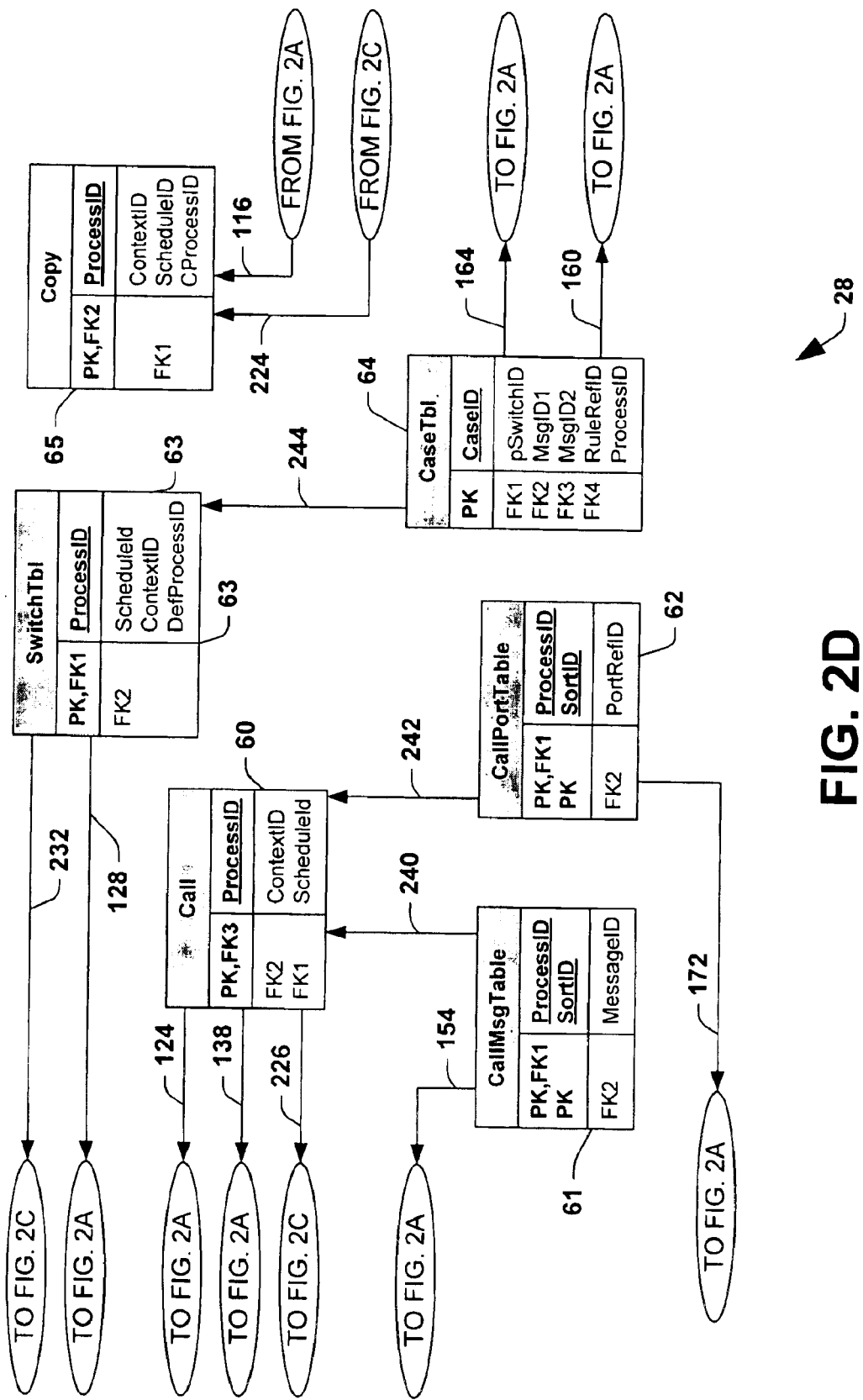
FIG. 2D is a schematic diagram further illustrating the database schema of FIGS. 2A–2C.
Figure 2E:
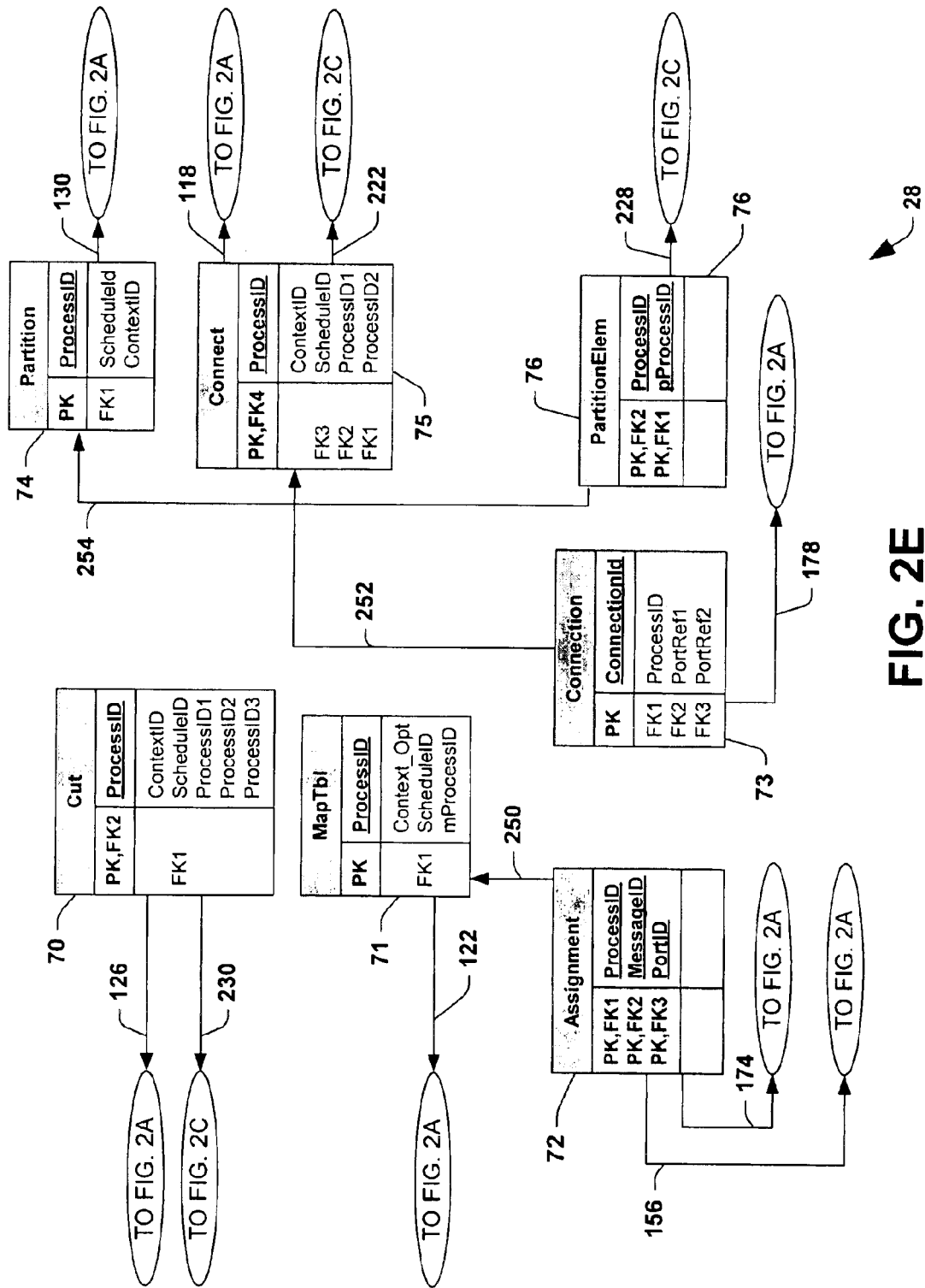
FIG. 2E is a schematic diagram further illustrating the database schema of FIGS. 2A–2D.
Figure 2F:
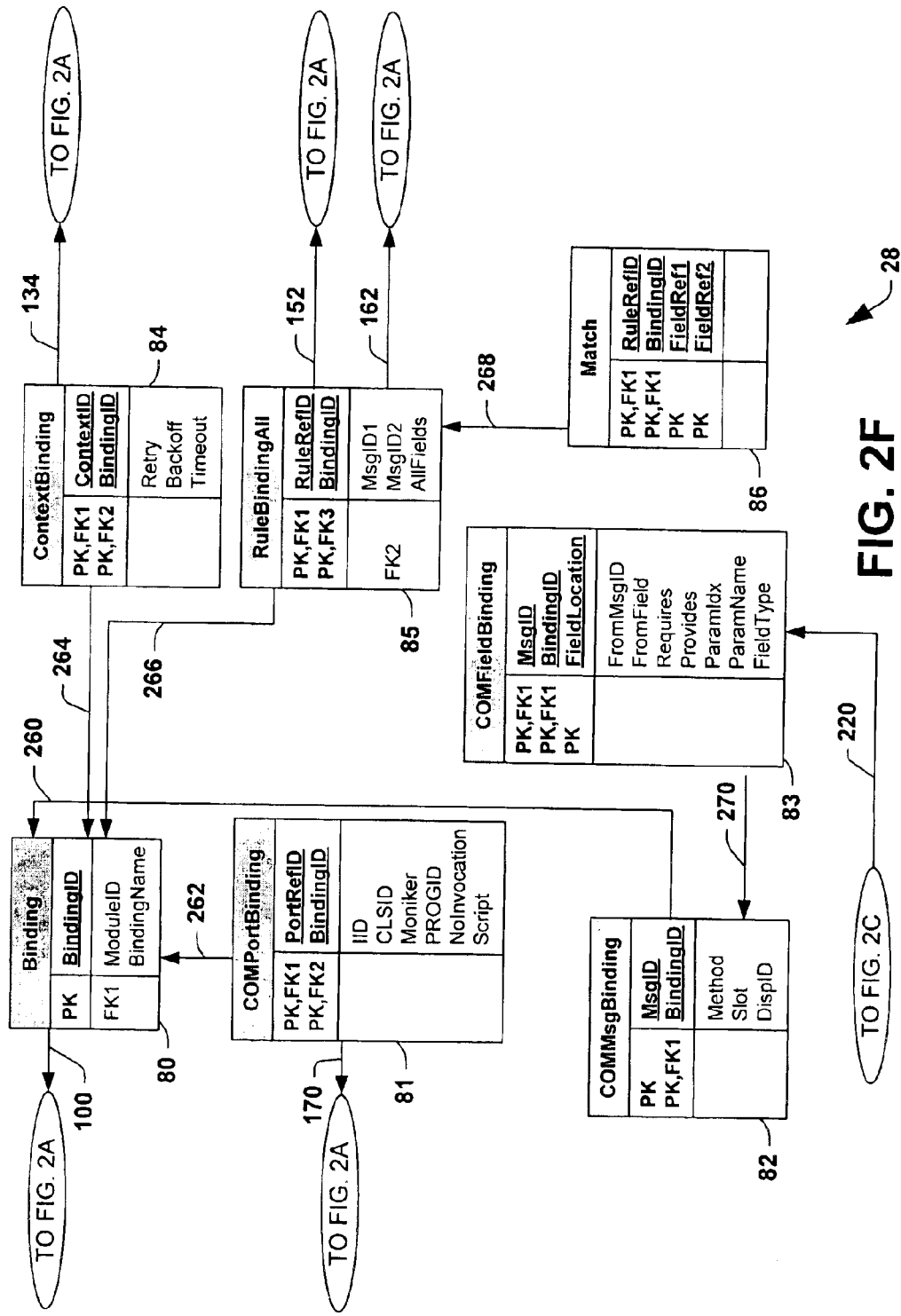
FIG. 2F is a schematic diagram further illustrating the database schema of FIGS. 2A–2E.

FIG. 2C illustrates another portion of the schema 28 comprising a RunCOMObjects table 50, a RunCOMField table 51, a RunContexts table 53, and a RunInstances table 54. The schema 28 further comprises a RunContextStatus table 55, a Process table 56, and a Parts table 57. Referring to FIG. 2D, the schema 28 also includes a Call table 60, a CallMsgTable table 61, a CallPortTable table 62, a SwitchTbl table 63, a CaseTbl 64, and a Copy table 65. Referring also to FIG. 2E, schema 28 includes a Cut table 70, a MapTbl table 71, an Assignment table 72, a Connection table 73, a Partition table 74, a Connect table 75, and a PartitionElem table 76. As illustrated in FIG. 2F, the database schema 28 further comprises a Binding table 80, a COMPortBinding table 81, a COMMsgBinding table 82, a COMFieldBinding table 83, a ContextBinding table 84, a RuleBindingAll table 85, and a Match table 86.

Schema Table Fields

The various tables of the database schema 28 illustrated in FIGS. 2A–2F comprise fields having field names, exemplary data types, and exemplary field sizes as described hereinafter. It will be appreciated that other field names, data types and 25 field sizes are possible and are contemplated as within the scope of the present invention. Referring now to FIG. 2A, the Schedule table 30 includes the following fields: ScheduleID: char(36); ScheduleName: varchar(100); ContextID: int; ModuleID: char(36); and ProcessID: int. The Schedule table 30 has a primary key ScheduleId and foreign keys FK1 ModuleID and FK2 ProcessID.

The Context table 31 comprises the following fields: ContextID: integer (identity); ContextName: varchar(100); ScheduleID: char(36); CompProcessID: integer, (null allowed); and TransactOpt: bit. In the Context table 31, the TransactOpt Boolean field specifies a transaction or a try-catch like construct. Since the context may be applied to multiple processes and actions, the tables that define actions and processes contain a reference to the context of which they are a part. The CompProcessID field of table 31 refers to a compensation process. Compensation is a process whereby an action may be taken upon failure or abortion of an action or transaction. Such an action may include, for example, rolling-back or otherwise modifying data associated with an action or transaction, sending a message, etc. A compensation process may refer to a specific action, message, etc. which is to be executed when it has been determined that the data or work associated with an action or transaction needs to be compensated. The Context table 31 further comprises a primary key ContextID and foreign keys FK1 ScheduleID and FK2 CompProcessID. The Module table 32 comprises ModuleID: char(36), and Module Name: varchar(100) fields. The Module table 32 further includes a primary key ModuleID. It will be noted that foreign keys in the binding and schedule tables refer to module. Message table 33 comprises fields MessageID: integer (identity); MessageName: varchar(100); and ScheduleID: char(36). The Message table 33 also comprises a primary key Message ID and a foreign key FK1 ScheduleID. CaseRule table 34 includes fields for RuleID, RuleName, and ScheduleID: char(36), with a primary key RuleID and a foreign key FK1 ScheduleID. Port table 35 includes fields PortID: integer (identity); PortName: varchar(100); and ScheduleID: char(36). The Port table 35 further includes a primary key PortID and a foreign key FK1 ScheduleID.

GroupTbl table 36 comprises the following fields: GroupID: char (16); Group Name: varchar(100); and SystemName: varchar(100). The GroupTbl table 36 further comprises a primary key GroupID. The GroupID may be passed by a runtime engine, and may be a COM+ app id assigned while creating a group. It will be appreciated that other schemas are possible within the scope of the invention in which users may define associations between groups and modules.

Referring also to FIG. 2B, the Sequence table 40 comprises fields ProcessID: integer; ScheduleID: char(36); ContextID: integer, (null allowed); and cProcessID: integer, (null allowed). The ProcessID field is a primary key as well as a foreign key into the Process table, as the process table contains all processes. The cProcessID field is the id of an optional tail process in a schedule sequence. The Action table 44 may have an entry pointing back to the Sequence table 40 for actions that are part of a sequence. The Sequence table 40 further comprises a primary key ProcessID, and foreign keys FK1 ProicessID, FK2 ScheduleID, FK3 ContextID, and FK4 cProcessID.

The Task table 41 comprises the following fields: ActionID: integer; ContextID: integer, (null allowed); and ChoiceIsAll: bit. The ChoiceIsAll field is true when all actions which are part of a task need to execute in parallel. The ActionID ill field is both a primary key and a foreign key (e.g., FK1) of the Task table 41. In the Task table 41, the ChoiceIsAll field determines whether task property is, for example, All or None. The SourceSink table 42 comprises: ActionID: integer; ContextID: integer, (null allowed); IsSource: bit; MessageID: integer; and PortID: integer fields, in which the IsSource field is true if the action is of source type and false if the action is of sink type. The SourceSink table 42 includes a primary key ActionID and foreign keys FK ActionID, FK2 MessageID, and FK3 PortRefID.

The Block table 43 comprises fields for BlockID; ScheduleID: char(36); ContextID: integer, (null allowed); and pSequenceID. The Block table 43 includes a primary key BlockID and foreign keys FK1 pSequenceID and FK2 ContextID. The Action table 44 comprises Action: integer (identity); ContextID: integer, (null allowed); pSequence: integer, (null allowed); SortID: smallint, (null allowed); pTaskID: integer, (null allowed); and ActionType: varchar (10) fields. This table 44 has a primary key Action, and a foreign key FK1 BlockID. An action may be part of a sequence or task, in which case, one of the fields pSequence and pTaskID may have a value, however both of them will not. The ActionType field may have one of the following values: 'call', 'source', 'sink', 'return', or 'release'. In the Action table 44, the ActionType field may be an enum that identifies the type of action. Note that the ActionID may be the key for the tables corresponding to different types of actions. The pSequence field is a sequence id in the container sequence. The pTaskID field is the container task if it is part of the task. The ContextInvocation table 45 includes fields ActionID: integer; ContextID: integer; and IsReturn: bit; where the IsReturn field value determines whether an action is a return or release. Table 45 further includes a primary key ActionID and foreign keys FK1 ActionID and FK2 ContextID.

In FIG. 2C, the RunCOMObjects table 50 comprises RunID: char(36); PortRef: integer; Time: datetime; and ObjectData: image fields, and may be used to persist objects that support an IPersistable interface. The ObjectData field is of image type which can store data BLOBs. The RunCOMObjects table primary keys RunID and PortRef, as well as foreign keys FK1 RunID and FK2 PortRef. The RunCOMField table 51 comprises the following fields: RunCOMFieldID: integer (identity); MsgID: integer; RunID: char (36); FieldLocation: varchar (100); BindingID: integer; Value: text; and Time: datetime. The table 51 has a primary key RunCOMFieldID, as well as foreign keys FK1 RunID, FK2 FieldLocation, FK2 BindingID, and FK2 MsgID. The RunCOMFieldID field of table 51 may be used as an identity field. None of the other fields can be combined to form a key since multiple calls could be made to the same method in the context of a schedule instance. The BindingID field may be used to identify a particular binding as there could be multiple bindings for the same schedule. In this case, the MsGID field alone is not enough to identify a binding. The Value field is of type text, which allows it to store content of an arbitrarily large size.

The RunProcessActions table 52 fields include RunID: char (36); ProcessID: integer; ActionID: integer; StartTime: datetime; EndTime: datetime; and ContextID: integer. The table 52 has primary keys ContextID, RunID, ProcessID, ActionID, and StartTime, along with foreign keys FK1 ProcessID, FK2 RunID, FK3 ActionID, and FK4 ContextID.

The table 52 may be used to store the runtime state of actions and processes (e.g., transactions) when a schedule instance is persisted. Each row may have the ActionID or ProcessID fields set but not both. Since the entries to the RunProcessActions table 52 are added while a schedule is running, fast access thereto may be provided thereto. The ContextID field is included in the table 52 to make it easy to query for the actions executed in the scope of a particular transaction. While it may be possible to obtain this information by querying the other tables, this information may need to be accessed frequently by a monitoring tool and the query to get the information may be complex. Thus, the ContextID field is provided in the table 52 in order to assure fast querying capabilities. In the RunProcessActions table 52, each row may include either the ProcessID or ActionID to give the status on that action or process.

The RunContexts table 53 fields comprise RunID: char (36); ContextID: integer; RetryCnt: integer, (null allowed); and NextRetryTime: datetime, (null allowed). The table 53 includes primary keys RunID and ContextID, as well as foreign keys FK1 ContextID and FK2 RunID. This table 53 may be used to track information about how many times a transactional context was retried. In this regard, a runtime engine may store information in the field NextRetryTime on when the transaction should be retried.

In the RunInstances table 54, the following fields are provided: RunID: char(36); ModuleID: char(36); Owner: varchar(50); Status: varchar(30); DeHydrationCnt: integer, (null allowed); LastDehydrated: datetime, (null allowed); LastRehydrated: datetime, (null allowed); StartTime: datetime; and EndTime: datetime, (null allowed). The Owner field value may indicate the person (e.g., NT login) who started the schedule. The table 54 may contain an entry for each module that was executed. In addition, the status field value may have one of the values: Running, Done, Paused or Dehydrated. The RunInstances table includes a primary key RunID and a foreign key FK1 Module ID.

The RunContextStatus table 55 fields include: RunID: char (36); ContextID: integer; Time: datetime; and Status: varchar(20). This table 55 may track the state of transactions in a schedule. Any time a transaction is aborted or committed, an entry may be added to the table 55. The possible values for the Status field include: Pending, Committed, Aborted, Compensating, and Compensated. As an example, the "Pending" state will be set when a compensation process, which needs to be executed for an aborted transaction, is started. This table 55 includes primary keys Time, Status, ContextID, and RunID, as well as foreign keys FK1 ContextID and FK1 RunID.

In the Process table 56, ProcessID: integer (identity), and Type: varchar(0) fields are provided, wherein ProcessID is a primary key. The ProcessTable may be an enumeration table of types of elements. For example, in any row, only one of the columns may contain valid data. This data may indicate what kind of element that the corresponding row represents, and ID for the type which is a foreign key to the table of that type. Recursion is possible because the type table may refer back to the ProcessTable 56 using the ProcessID field. Possible values for the Type field include: Sequence, Map, Partition, Connect, Switch, Cut, and Copy. In the Parts table 57, ScheduleID: char(36), and Tablename fields are provided. This table 57 has a primary key ScheduleID and a foreign key Tablename.

Referring now to FIG. 2D, the Call table 60 fields comprises ActionID: integer; ContextID: integer, (null allowed); and ScheduleID: char (36) fields. This table 60 has a primary key ProcessID and foreign keys FK1 ScheduleID, FK2 ContextID, and FK3 ProcessID. CallMsgTable table 61 comprises fields ProcessID: integer (identity); SortID: smallint (null allowed); and MessageID: integer. Table 61 includes primary keys ProcessID and SortID, as well as foreign keys FK1 ProcessID and FK2 MessageID. The CallPortTable table 62 comprises fields ProcessID: integer (identity); SortID: smallint (null allowed); and PortRefID: integer. Table 62 further comprises primary keys ProcessID and SortID, as well as foreign keys FK1 ProcessID and FK2 PortRefID. SwitchTbl table 63 comprises fields: ProcessID: integer; ScheduleID: char (36); ContextID: integer, (null allowed); and DefProcessID: integer, (null allowed), wherein the DefProcessID is the id of the process to be invoked if this is true. The SwitchTbl table 63 includes a primary key ProcessID and foreign keys FK1 ProcessID and FK2 ScheduleID. CaseTbl table 64 comprises fields CaseID: integer; pSwitchID: integer; MsgID1: integer; MsgID2: integer; RuleRefID: integer; and ProcessID: integer. This table 64 has a primary key CaseID, and foreign keys FK1 pSwitchID, FK2 MsgID1, Fk3 MsgID2, and FK4 RuleRefID. The CaseTbl table 64 comprises details on the non-default conditions. Copy table 65 fields include ProcessID: integer; ScheduleID: char (36); ContextID: integer, (null allowed); and cProcessID: integer. Table 65 further includes primary key ProcessID and foreign keys FK1 ScheduleID and FK2 ProcessID.

In FIG. 2E, the Cut table 70 comprises fields ProcessID: integer; ScheduleID: char (36); ContextID: integer, (null allowed); ProcessID1: integer; ProcessID2: integer; and ProcessID3: integer. The Cut table 70 has a primary key ProcessID and foreign keys FK1 ScheduleID and ProcessID. The Cut table 70 comprises a list of components or elements which communicate with each other, and which are included in the Process table 56.

The MapTbl table 71 comprises fields ProcessID: integer; ScheduleID: char (36); ContextID: integer, (null allowed); and mProcessID: integer. MapTbl table 71 has a primary key ProcessID and a foreign key FK1 ScheduleID. The Assignment table 72 comprises fields ProcessID: integer; MessageID: integer; and PortID: integer. The table 72 further includes primary keys ProcessID, MessageID, and PortID, as well as foreign keys ProcessID, MessageID and PortID. The ProcessID field in the Assignment table 72 points to the ID of Map process, and the Assignment table 72 comprises port and message information related to the map.

The Connection table 73 comprises fields ConnectionID: integer (identity); ProcessID: integer; PortRef1: integer; and PortRef2: integer. Table 73 also comprises a primary key ConnectionID and foreign keys FK1 ProcessID, FK2 PortRef1, and FK3 PortRef2. The Partition table 74 includes fields. ProcessID: integer; ScheduleID: char (36); and ContextID: integer, (null allowed). In addition, table 74 includes a primary key ProcessID and a foreign key FK1 ScheduleID. The Partition table 74 comprises a list of independent components or elements, which are included in the Process table 56.

The Connect table 75 comprises fields ProcessID: integer; ScheduleID: char (36); ContextID: integer, (null allowed); ProcessID1: integer; and ProcessID2: integer. Table 75 also has a primary key ProcessID, and foreign keys FK1 ProcessID2, FK2 ProcessID1, FK3 ScheduleID, and FK4 ProcessID. The ports that are connected as per this connect process may be specified in the Connection table 73. The PartitionElem table 76 includes fields ProcessID: integer and pProcessID: integer. The ProcessID field is the id of the processes that are part of partitions. The pProcessID field is the id of the corresponding partition process. PartitionElem table 76 includes primary keys ProcessID and pProcessID, and in addition, foreign keys ProcessID and pProcessID.

Referring now to FIG. 2F, the Binding table 80 fields include BindingID: integer (identity); ModuleID: integer;

and BindingName: varchar(100). This table 80 has a primary key BindingID and a foreign key FK1 BindingName. The COMPortBinding table 81 comprises fields BindingID: integer; PortRefID: integer; IID: char(16); CLSID: char(16); PROGID: varchar(200); Moniker: varchar(200); Script: varchar(200); and NoInvocation: bit. The COMPortBinding table 81 also has primary keys PortRefID and BindingID along with foreign keys FK1 PortRefID and FK2 BindingID. The COMMsgBinding table 82 comprises fields MsgID: integer; BindingID: integer; Method: varchar (100); Slot: smallint; and DispID: smallint. This table 82 has primary keys MsgID and BindingID and a foreign key FK1 BindingID. The COMFieldBinding table 83 comprises fields MsgID: integer; BindingID: integer; FieldLocation: varchar (200); FromX: varchar(100); Requires: bit; Provides: bit; Paramidx: smallint; ParamName: varchar(100); and FieldType: char(20). The table 83 also has primary keys MsgID, BindingID, and FieldLocation, and field keys FK1 MsgID and FK1 BindingID.

The ContextBinding table 84 comprises fields ContextID: integer; BindingID: integer; Retry: smallint, (null allowed); Backoff: smallint, (null allowed); and Timeout: smallint, (null allowed). This table 84 includes primary keys ContextID and BindingID as well as foreign keys FK1 ContextID and FK2 BindingID. The RuleBindingAll table 85 has fields RuleRefID: integer; BindingID: integer; MsgID1: integer; MsgID2: integer; and AllFields: bit. The RuleBindingAll table 85 has primary keys RuleRefID and BindingID as well as foreign keys FK1 RuleRefID, FK2 MsgID2, and FK3 BindingID. If the AllFields field is False, there will be entries in the Match table 86 to specify which fields need to be matched. The Match table 86 comprises fields RuleRefID: integer; BindingID: integer; FieldRef1: integer; and FieldRef2: integer. Table 86 has primary keys RuleRefID, BindingID, FieldRef1, and FieldRef2, as well as foreign keys FK1 RuleRefID and FK1 BindingID.

Schema Table Relationships

The exemplary database schema 28 illustrated in FIGS. 2A–2F comprises various tables as illustrated and described supra, as well as relationships between the schema tables, which are illustrated and described in greater detail hereinafter. One or more of the schema tables include information relating to the definition of a schedule, which may be advantageously employed to reconstruct the schedule definition language solely from information in a database. In addition, the schema 28 may include one or more tables related to instance information having, for example, information describing what instances of a schedule are running and what definitions they correspond to, as well as positional information, such as what actions are currently live, how many messages are currently pending, and other schedule state information. Moreover, the schedule definition and binding information portions or tables of the schema may be normalized to a higher degree than are those relating to runtime information. In this way, an efficient storage methodology and system are provided for less frequently used tables (e.g., schedule definition and binding information), while fast access is provided to runtime information.

The database schema may also include runtime data associated with a schedule instance. Such data may include the value of specific messages, etc. According to one aspect of the invention, the database state information and data may be persisted to the database during execution at transaction boundaries. Schedule data and state information may also be persisted to the database during dehydration operations based on latency hints or attributes. The database schema provides a format for storing the persisted information in a relational database.

Because the schema may be fixed, the invention also allows the use of monitoring and other tools to query against the database, in order to indicate the status of a running workflow process, as well as how specific instances of the process are running. The use of existing or common database tools (e.g., from database management systems or DBMSs) for obtaining this information is enabled by the use of overlapping schemas for definitional purposes and to describe runtime instances and data.

The relationships between the various tables of the exemplary database schema 28 are now discussed in association with FIGS. 2A–2F. In FIG. 2A, Module table 32 has relationships or links 100 from Binding table 80 in FIG. 2F, 102 from RunInstances table 54 in FIG. 2C, and 104 from Schedule table 30. Schedule table 30, has further links 106 from Message table 33, 108 from CaseRule table 34, 110 from f) Port table 35, and 112 from Context table 31. The Schedule table 30 further includes link 114 to the Process table 56 of FIG. 2C, link 116 from Copy table 65 of FIG. 2D, link 118 from Connect table 75 in FIG. 2E, link 120 from the Sequence table 40 of FIG. 2B, link 122 from the MapTbl table 71 in FIG. 2E, link 124 from the Call table 60 in FIG. 2D, link 126 from the Cut table 70 in FIG. 2E, link 128 from the SwitchTbl table 63 in FIG. 2D, and link 130 from the Partition table 74 in FIG. 2E.

The Context table 31 of FIG. 2A includes incoming relationships or links 132 from RunContexts table 53 in FIG. 2C, 134 from ContextBinding table 84 in FIG. 2F, 136 from RunProcessActions table 52 in FIG. 2C, and 138 from Call table 60 in FIG. 2D. The Context table 31 also has an outgoing link 140 to the Process table 56 of FIG. 2C. Context table 31 of FIG. 2A also includes incoming links 142 from Sequence table 40 of FIG. 2B, 144 from ContextInvocation table 45 of FIG. 2B, and 146 from Block table 43 of FIG. 2B.

The Message table 33 of FIG. 2A has incoming links 150 from SourceSink table 42 of FIG. 2B, 152 from RuleBindingAll table 85 of FIG. 2F, 154 from CallMsgTable table 61 of FIG. 2D, 156 from the Assignment table 72 of FIG. 2E, and 160 from CaseTbl table 64 of FIG. 2D. The CaseRule table 34 of FIG. 2A has incoming links 162 from RuleBindingAll table 85 of FIGS. 2F and 164 from the CaseTbl table 64 of FIG. 2D.

Port table 35 of FIG. 2A includes incoming links 166 from RunCOMObjects table 50 of FIG. 2C, 168 from SourceSink table 42 of FIG. 2B, 170 from COMPortBinding table 81 of FIG. 2F, 172 from CallPortTable table 62 of FIG. 2D, 174 from Assignment table 72 of FIG. 2E, and 178 from the Connection table 73 of FIG. 2E.

In FIG. 2B, Task table 41 has a link 180 to Action table 44. Table 44, in turn, has incoming links 182 and 184 from SourceSink table 42 and ContextInvocation table 45, respectively. Action table 44 further includes outgoing link 186 to the Block table 43, which in turn, has an outgoing link 188 to the Sequence table 40. Sequence table 40 further has an outgoing link 190 to the Process table 56 of FIG. 2C. Action table 44 further includes an incoming link 192 from the RunProcessActions table 52 of FIG. 2C.

Referring now to FIG. 2C, RunInstances Table 54 has incoming links 200 from RunCOMObjects table 50, 202 from RunCOMField table 51, 204 from RunProcessActions table 52, and 210 from RunContexts table 53. Link 206 relates RunProcessActions table 52 to Process table 56. Link 208 relates RunContextStatus table 55 to RunContext table 53. RunCOMField table 51 has an outgoing link 220 to COMFieldBinding table 83 of FIG. 2F. In addition to those incoming links described above, Process table 56 of FIG. 2C further includes incoming links 222 from Connect table 75 in FIG. 2E, 224 from Copy table 65 in FIG. 2D, 226 from Call table 60 in FIG. 2D, 228 from PartitionElem table 76 in FIG. 2E, 230 from Cut table 70 in FIG. 2E, and 232 from SwitchTbl table 63 in FIG. 2D.

Referring now to FIGS. 2D–2F, CallMsgTable 61 has an outgoing link to Call table 60, which in turn has an incoming link 242 from CallPortTable 62. In addition, CaseTbl table 64 has a link 244 to SwitchTbl table 63. Assignment table 72 of FIG. 2E has an outgoing link 250 to MapTbl table 71. Link 252 relates Connection table 73 to Connect table 75, and link 254 relates PartitionElem table 76 to the Partition table 74. In FIG. 2F, a link 260 relates COMMsgBinding table 82 to Binding table 80. Binding table 80 has further incoming links 262 from COMPortBinding table 81, 264 from ContextBinding table 84, and 266 from RuleBindingAll table 85. Link 268 relates Match table 86 to the RuleBindingAll table 85, and 270 relates the COMFieldBinding table 83 to COMMsgBinding table 82.

The schema 28 of FIGS. 2A–2F provides a complete definition of a transaction processing schedule, as well as one or more bindings for specific hardware applications thereof. Thus, it is possible to reconstruct the schedule definition language representation of a schedule, and the binding for the schedule solely from the information in the database. The schema 28, moreover, provides a data structure for storing and managing runtime information related to instances of a schedule in a database. The runtime information may comprise, for example, schedule state information, data, and messages associated with a running schedule application.

In order to make updates to the database by the runtime engine fast, the schema 28 may not be fully normalized and some tables contain redundant information. At the same time, the tables of the schema 28 for storing schedule and binding definition should be efficient. As such, these tables are normalized with clearly defined foreign key relationships to make storage optimal. Accordingly, the tables designed to contain non-runtime information in the exemplary schema 28 have been normalized to the third normal form. Thus, most of the schema is normalized to third normal form. In some instances, especially in the case of tables that will be accessed frequently by the runtime engine (e.g., RunProcActions 52) some redundant information may be stored in the interest of simplifying and increasing the speed of queries.

In addition, the database schema according to the invention is portable to multiple database systems. This allows users to employ many different relational database management systems (RDBMS) to store and access the schedule-related information. Accordingly, the schema 28 may not use any data types or constructs unique to any particular SQL server.

Prior to executing schedules, a runtime engine or system may create data set names (DSNs), create a database and associated tables therein according to the schema 28, and obtain read/modify access to the login-id of the runtime engine. For the sake of simplicity, a group manager may assume that a file DSN with the same name as the name of its COM+ application has been configured by the administrator on the system in which the group manager is installed. This DSN may point to an appropriate SQL server to use and be configured to use, for example, Windows NT authentication. In this case, in the property page under a workflow tab, for the group manager the DSN name will be listed (the COM+application name). Next to the DSN name, there will be a "Test Data Source" button, which may test access to the database pointed to by the DSN. In addition, a "Configure data source" button may be provided which will help a user configure the DSN and create the tables, stored processes, and access accounts on the database.

The login id of the user (e.g., the administrator) will be passed to the SQL to open a connection. Thus, the administrator using the MMC may need, for example, dbcreator (a system role in SQL server) level (or higher) permissions in the SQL server. The configure operation may also allow the user to specify the login id of users who will have read/modify privileges to the database. The userid of the group manager process may either be on this list or otherwise configured to allow access to the database. When a user runs a schedule, the group manager may use its login id to access the database.

In addition, a cleanup utility may be provided that can be used to remove data related to old schedules and instances. Such a utility may be run periodically to cleanup the database. As an example, a cleanup utility may allow a user to remove instances whose schedules don't exist, remove schedules (or instances) that were not executed for a certain period of time, remove schedule instances executed before a certain date, and/or remove schedule instances owned by someone.

The exemplary schema 28 illustrated in FIGS. 2A–2F and described hereinabove is one example of a database schema in accordance with the present invention. It will be appreciated by those skilled in the art that other schemas are possible within the scope of the invention beyond those specifically illustrated and described herein. For example, the invention contemplates database schemas wherein one or more of the tables illustrated in the exemplary schema 28 are combined into a single table. Moreover, other variations are possible, wherein one or more of the tables in the exemplary schema 28 are divided into two or more such tables, with corresponding relationships. The invention thus comprises all such variations within the scope of the appended claims.

Method of Storing Process Information in a Database

As illustrated and described supra, the present invention provides a database schema for storage of process information in a database, with one or more tables therein representing process definition information derived from a process definition language representation of a process. A process or schedule may be defined by a user graphically or using a schedule definition language. The schedule is then represented in one or more tables in a database schema (e.g., schema 28 of FIGS. 2A–2F). In accordance with another aspect of the invention, the database schema may comprise both a definitional element with at least one definition table for storing a process definition, and a runtime element with at least one instance table for storing instance information and at least one data table for storing runtime data.

The invention further provides a method for storing process information in a database. The method comprises providing a database schema, having a definitional element with a definition table for storing a process definition, and a runtime element with at least one instance table for storing instance information and at least one data table for storing runtime data. The method further comprises storing a process definition in the database according to the definition table, storing instance information in the database according to the instance table, and storing runtime data in the database according to the data table.

A runtime engine executing a schedule may store or persist data or information relating to the schedule instance in a storage medium for various reasons. Persistence of data is required, for example, to enable dehydration and rehydration of a schedule instance, particularly for long running transactions or schedules. According to this process, binding information may include latency hints or attributes for individual actions and/or transactions within a schedule. These attributes or hints may be used at runtime to decide whether to suspend execution of a schedule and dehydrate the schedule to a storage medium during the pendency of a long running action or transaction. The schedule may then be reawakened or rehydrated (e.g., read from the storage medium) upon the occurrence of an event (e.g., message), after which execution thereof may proceed.

Another reason for persisting schedule-related information is to provide for recovery of a schedule instance when the runtime system goes down. For example, a runtime engine or system may fail during execution of a schedule instance. When the engine comes back up, it will need to determine where to resume execution of the transaction. In such a case, the exemplary schema 28 provides a database structure from which a runtime engine may determine the state of a schedule instance. Similarly, where a transaction or action within a schedule fails or aborts, the runtime engine needs a way of determining what has completed prior to the failure, in order to carry out compensation routines or processes.

In addition to the above reasons, schedule-related information may be persisted to a storage medium periodically or at transaction boundaries, in order to enable or support debugging and/or monitoring of running schedules. The schema 28 provides a structure by which schedule state information (e.g., pending, completed, or aborted actions and/or transactions), messages, and/or data associated with actions or processes that are in the context of a transaction. Database management system query tools may be employed to monitor such information according to the schema 28. This allows a user to determine the current state of actions and/or transactions within a schedule using existing tools. As a result, troubleshooting or debugging a schedule may be facilitated.

Figure 3:
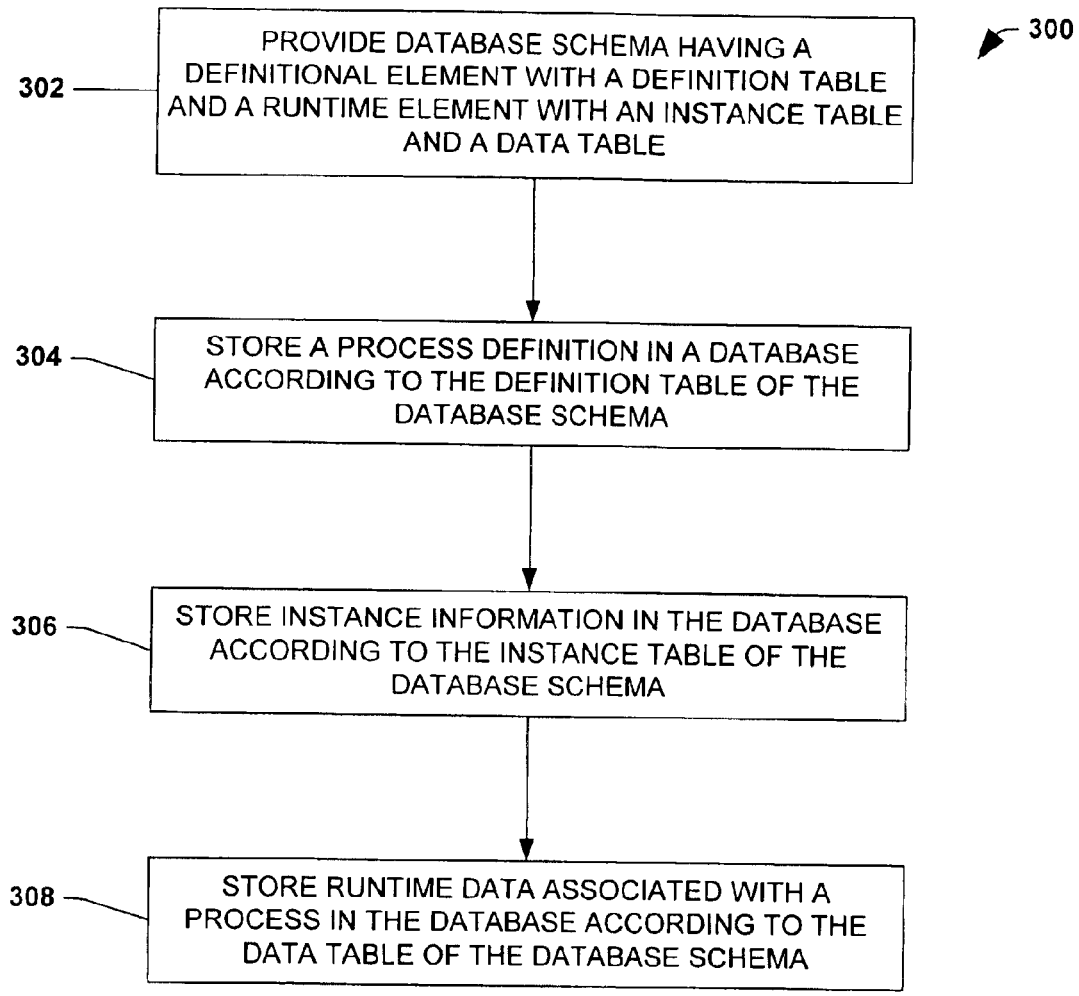
FIG. 3 is a flow diagram illustrating an exemplary method for storing process information in a database in accordance with the invention.

Referring now to FIG. 3, an exemplary method 300 for storing process information in a database in accordance with the invention is illustrated. Beginning at step 302, a database schema is provided having a definitional element with a definition table and a runtime element with an instance table and a data table. At step 304, a process definition is stored in the database according to the schema definition table. Instance information is stored in the database at step 306 according to the instance table of the schema. At step 308, runtime data is stored in the database according to the data table of the database schema.

Method of Monitoring Process Information in a Database

Figure 4:
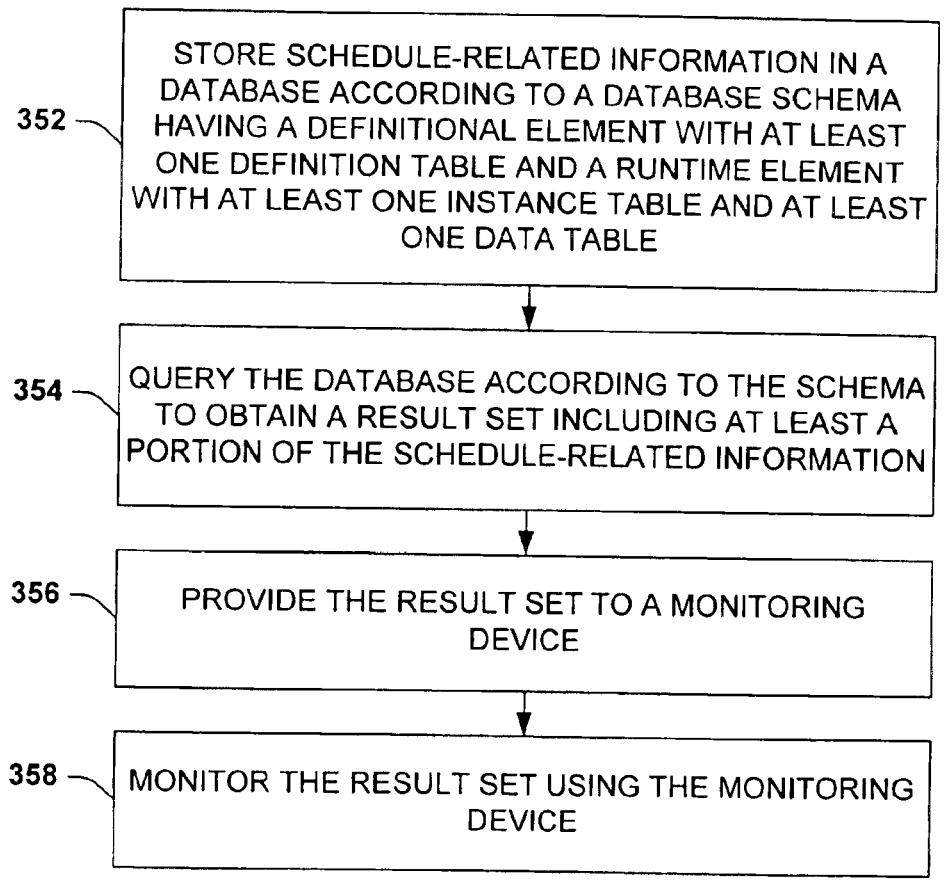
FIG. 4 is a flow diagram illustrating an exemplary method of monitoring process information in a database according to the invention.

Referring now to FIG. 4, an exemplary method 350 of monitoring process information in a database is illustrated in accordance with the invention. The method 350 begins at step 352, wherein schedule-related information is stored in the database according to a database schema The schema (e.g., schemas 2, 8, and 28 described supra) may have a definitional element with at least one definition table for storing a process definition, and a runtime element with at least one instance table for storing instance information and at least one data table for storing runtime data. At step 354, the database is queried according to the database schema to obtain a result set which comprises at least a portion of the schedule-related information. The result set is provided to a monitoring device at step 356, and monitored at step 358. The method provides a user with status information and data associated with a running process, allowing progress monitoring and debugging of running schedules. The method of the present invention may be implemented in existing computer systems. Moreover, the queries of the method may be accomplished with query tools of existing database management systems.

Exemplary Operating Environment

Figure 5:
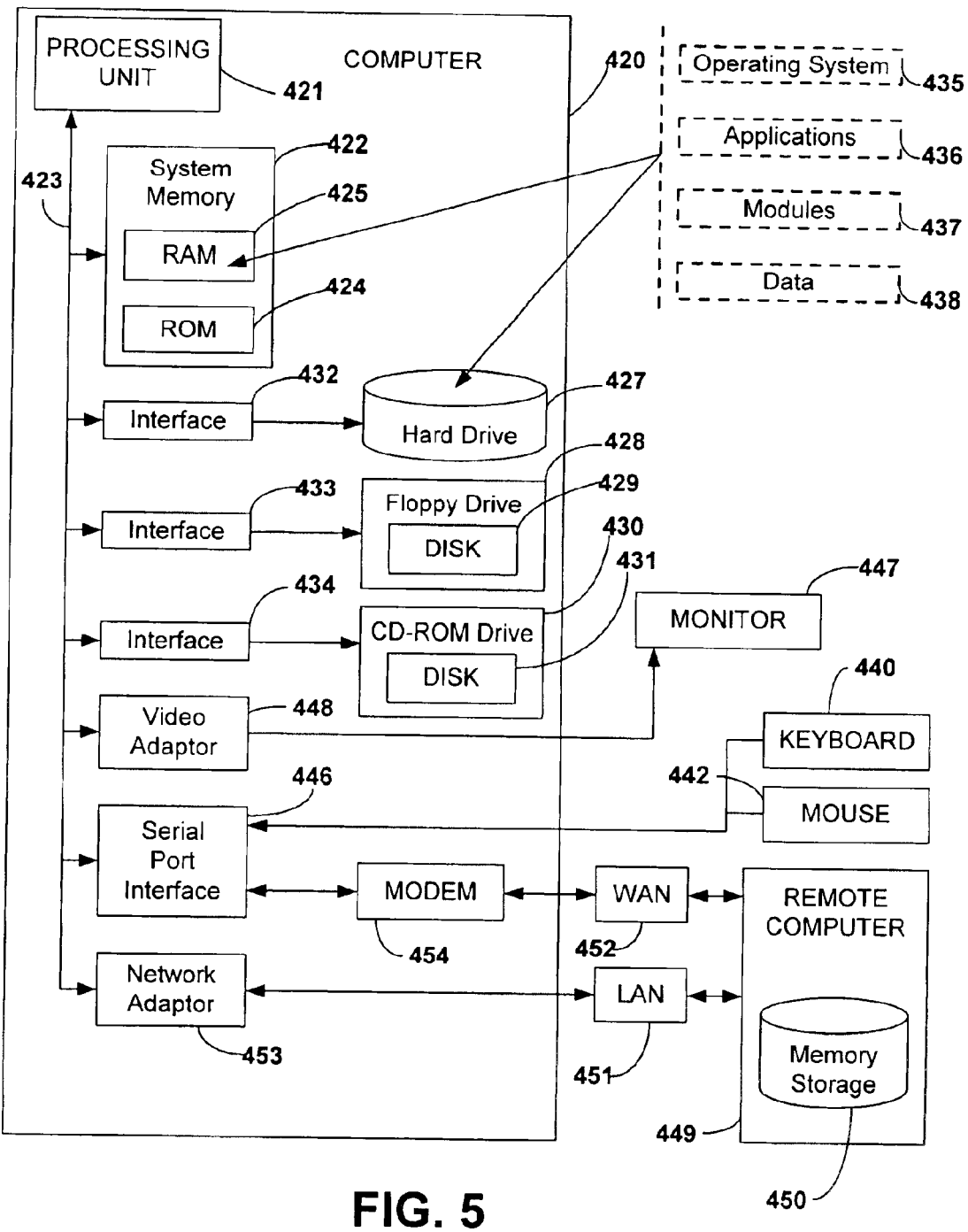
FIG. 5 is a schematic diagram illustrating an exemplary environment in which the various aspects of the invention may be carried out.

In order to provide a context for the various aspects of the invention, FIG. 5 and the following discussion are intended to provide a brief, general description of a suitable computing environment in which the various aspects of the present invention may be implemented. While the invention has been described above in the general context of computer-executable instructions of a computer program that runs on a computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based or programmable consumer electronics, and the like. The illustrated aspects of the invention may also be practiced in distributed computing environments where tasks are performed by remote processing devices that are linked through a communications network. However, some, if not all aspects of the invention can be practiced on stand-alone computers. In a distributed computing environment, program modules may be located in both local and remote memory storage devices.

With reference to FIG. 5, an exemplary system for implementing the various aspects of the invention includes a conventional server computer 420, including a processing unit 421, a system memory 422, and a system bus 423 that couples various system components including the system memory to the processing unit 421. The processing unit may be any of various commercially available processors, including but not limited to Intel x86, Pentium and compatible microprocessors from Intel and others, including Cyrix, AMD and Nexgen; Alpha from Digital; MIPS from MIPS Technology, NEC, IDT, Siemens, and others; and the PowerPC from IBM and Motorola. Dual microprocessors and other multi-processor architectures also can be used as the processing unit 421.

The system bus may be any of several types of bus structure including a memory bus or memory controller, a peripheral bus, and a local bus using any of a variety of conventional bus architectures such as PCI, VESA, Microchannel, ISA and EISA, to name a few. The system memory includes read only memory (ROM) 424 and random access memory (RAM) 425. A basic input/output system (BIOS), containing the basic routines that help to transfer information between elements within the server computer 420, such as during start-up, is stored in ROM 424.

The server computer 420 further includes a hard disk drive 427, a magnetic disk drive 428, e.g., to read from or write to a removable disk 429, and an optical disk drive 430, e.g., for reading a CD-ROM disk 431 or to read from or write to other optical media. The hard disk drive 427, magnetic disk drive 428, and optical disk drive 430 are connected to the system bus 423 by a hard disk drive interface 432, a magnetic disk drive interface 433, and an optical drive interface 434, respectively. The drives and their associated computer-readable media provide nonvolatile storage of data, data structures, computer-executable instructions, etc. for the server computer 420. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment, and further that any such media may contain computer-executable instructions for performing the methods of the present invention.

A number of program modules may be stored in the drives and RAM 425, including an operating system 435, one or more application programs 436, other program modules 437, and program data 438. The operating system 435 in the illustrated computer is the Microsoft Windows NT Server operating system, together with the before mentioned Microsoft Transaction Server.

A user may enter commands and information into the server computer 420 through a keyboard 440 and a pointing device, such as a mouse 442. Other input devices (not shown) may include a microphone, a joystick, a game pad, a satellite dish, a scanner, or the like. These and other input devices are often connected to the processing unit 421 through a serial port interface 446 that is coupled to the system bus, but may be connected by other interfaces, such as a parallel port, a game port or a universal serial bus (USB). A monitor 447 or other type of display device is also connected to the system bus 423 via an interface, such as a video adapter 448. In addition to the monitor, computers typically include other peripheral output devices (not shown), such as speakers and printers.

The server computer 420 may operate in a networked environment using logical connections to one or more remote computers, such as a remote client computer 449. The remote computer 449 may be a workstation, a server computer, a router, a peer device or other common network node, and typically includes many or all of the elements described relative to the server computer 420, although only a memory storage device 450 is illustrated in FIG. 5. The logical connections depicted in FIG. 5 include a local area network (LAN) 451 and a wide area network (WAN) 452. Such networking environments are commonplace in offices, enterprise-wide computer networks, intranets and the Internet.

When used in a LAN networking environment, the server computer 420 is connected to the local network 451 through a network interface or adapter 453. When used in a WAN networking environment, the server computer 420 typically includes a modem 454, or is connected to a communications server on the LAN, or has other means for establishing communications over the wide area network 452, such as the Internet. The modem 454, which may be internal or external, is connected to the system bus 423 via the serial port interface 446. In a networked environment, program modules depicted relative to the server computer 420, or portions thereof, may be stored in the remote memory storage device.

It will be appreciated that the network connections shown are exemplary and other means of establishing a communications link between the computers may be used.

In accordance with the practices of persons skilled in the art of computer programming, the present invention has been described with reference to acts and symbolic representations of operations that are performed by a computer, such as the server computer 420, unless otherwise indicated. Such acts and operations are sometimes referred to as being computer-executed. It will be appreciated that the acts and symbolically represented operations include the manipulation by the processing unit 421 of electrical signals representing data bits which causes a resulting transformation or reduction of the electrical signal representation, and the maintenance of data bits at memory locations in the memory system (including the system memory 422, hard drive 427, floppy disks 429, and CD-ROM 431) to thereby reconfigure or otherwise alter the computer system's operation, as well as other processing of signals. The memory locations where such data bits are maintained are physical locations that have particular electrical, magnetic, or optical properties corresponding to the data bits.

Although the invention has been shown and described with respect to a certain embodiments, it will be appreciated that equivalent alterations and modifications will occur to others skilled in the art upon the reading and understanding of this specification and the annexed drawings. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (i.e., that is functionally equivalent), even though not structurally equivalent to the disclosed structure, which performs the function in the herein illustrated exemplary embodiments of the invention.

It will also be recognized that the invention includes a computer-readable medium having computer-executable instructions for performing the steps of the various methods of the invention. In addition, while a particular feature of the invention may have been disclosed with respect to only one of several embodiments, such feature may be combined with one or more other features of the other embodiments as may be desired and advantageous for any given or particular application. Furthermore, to the extent that the terms "includes", "including", "has", "having", and variants thereof are used in either the detailed description or the claims, these terms are intended to be inclusive in a manner similar to the term "comprising" and its variants.

What is claimed is:

1. A database schema for storage of process information in a database, comprising:

at least one table representing process definition information derived from a process definition language representation of a processing; and a component that stores a schedule state in the database when a transaction in a schedule is committed, a compensation process is started and unfinished, and the schedule is dehydrated.

2. The schema of claim 1, the at least one table representing process definition information stores a schedule definition in the database.

3. The schema of claim 1, further comprising a second table representing runtime information relating to execution of an instance of the schedule.

4. The schema of claim 3, the process comprises the schedule and the second table further represents at least one of a state of transactions associated with an instance of the schedule, messages associated with the instance of the schedule, and the state of actions associated with the instance of the schedule.

5. The schema of claim 1, further comprising a second table representing runtime information relating to execution of an instance of the process.

6. The schema of claim 5, the process comprises at schedule and the second table further represents at least one of a state of transactions associated with an instance of the schedule, messages associated with the instance of the schedule, and the state of actions associated with the instance of the schedule.

7. A database schema for storage of process information in a database, comprising:
 a definitional element with at least one definition table that stores a process definition;
 a runtime element with at least one instance table that stores instance information associated with an instance of the process and at least one data table that stores runtime data associated with the process; and
 a state element that stores a schedule state associated with a committed schedule transaction, a compensation process that started and finished and a dehydrated schedule.

8. The database schema of claim 7, the runtime data comprises at least one of the state of transactions associated with an instance of the process, messages associated with the instance of the process, and the state of actions associated with an instance of the process.

9. The database schema of claim 7, the definitional element further comprises at least one table for storing binding information associated with the process.

10. The database schema of claim 9, the process comprises a schedule.

11. The database schema of claim 10, at least a portion of the schema is normalized.

12. The database schema of claim 7 the process comprises a schedule.

13. The database schema of claim 7, the definitional element further comprises at least one table for storing binding information associated with the process.

14. The database schema of claim 7, vie at least a portion of the schema is normalized.

15. A method for storing process information in a database, comprising:
 providing a database schema having a definitional element with at least one definition table for storing a process definition; and a runtime element with at least one instance table for storing instance information and at least one data table for storing runtime data;
 storing a process definition in the database according to the at least one definition table;
 storing instance information associated with the process in the database according to the at least one instance table; and
 storing runtime data associated with a process in the database according to the at least one data table, the storing of the runtime data comprising:
 storing a schedule state in the database when a transaction in the schedule is committed;
 storing a schedule state in the database when a compensation process is started and finished; and
 storing a schedule state in the database when a schedule is dehydrated.

16. The method of claim 15, storing instance information in the database according to the at least one instance table comprises storing binding information in the database.

17. The method of claim 15, storing runtime data in the database according to the at least one data table comprises storing at least one transaction state, actions, and processes executed, and messages in the database.

18. The method of claim 15, storing runtime data in the database according to the at least one data table comprises storing at least one transaction state, actions, and processes executed, and messages in the database.

19. The method of claim 15, storing instance information in the database according to the at least one instance table comprises storing binding in the database.

20. A computer-readable medium having computer-executable instructions for performing steps comprising:
 storing a process definition in a database according to at least one definition table of a database schema;
 storing instance information associated with the process in the database according to at least one instance table of the database schema;
 storing runtime data associated with the process in the database according to at least one data table of the database schema;
 storing a first schedule state in the database when a transaction in a schedule is committed;
 storing a second schedule state in the database when a compensation process is started and finished; and
 storing a third schedule state in the database when the schedule is dehydrated.

21. The computer-readable medium of claim 20, further comprising computer-executable instruction for:
 querying the database according to the database schema to obtain a result set, the result set comprises at least a portion of the runtime data associated with the process;
 providing the result set to a monitoring device; and
 monitoring the result set via the monitoring device.

22. A computer-readable medium having stored thereon a data structure, comprising:
 a first data component with data representing a definition of a process;
 a second data component with data representing instance information relating to an instance of the process;
 a third data component with data representing runtime data relating to an instance of the process; and
 a fourth data component with data representing a schedule state relating to at least one of a transaction associated with a committed schedule, a compensation process that started and finished, or a dehydrated schedule.

23. The computer-readable medium of claim 22, the data structure further comprises a fifth data component with data representing binding information associated with the process.

24. A method of monitoring a schedule having schedule-related information associated therewith, comprising:
 querying a database having schedule-related information stored therein according to a database schema to obtain a result set, the database schema comprises a definitional element with at least one definition table for storing a process definition, and a runtime element with at least one instance table for storing instance information and at least one data table for storing runtime data, the schedule-related information includes at least one of a schedule state associated with a committed transaction, a compensation process, and a dehydrated schedule, and the result set comprises at least a portion of the schedule-related information;

providing the result set to a monitoring device; and monitoring the result set via the monitoring device.

25. The method of claim 24, further comprising storing schedule-related information in the database according to the database schema.

26. The method of claim 24, monitoring the schedule-related information comprises history reporting.

27. The method of claim 24, monitoring the state information includes event monitoring.

28. A computer-readable medium having computer-executable instructions for performing steps comprising:

querying a database having schedule-related information stored therein according to a database schema to obtain a result set, wherein the database schema copses a definitional element with at least one definition table for storing a process definition, and a runtime element with at least one instance table for storing instance information and at least one data table for storing runtime data, which includes storing a schedule state in the database when at least one of a transaction in the schedule is committed, a compensation process is started and finished, and the schedule is dehydrated, and the result set comprises at least a portion of the schedule-related information;

providing the result set to a monitoring device; and monitoring the result set via the monitoring device.

29. The computer-readable medium of claim 28, further comprising having further computer-executable instructions for storing schedule-related information in the database according to the database schema.

30. A database schema system, comprising:

means for storing a process definition in a database according to at least one definition table of a database schema;

means for storing instance information associated with the process in the database according to at least one instance table of the database schema;

means for storing runtime data associated with the process in the database according to at least one data table of the database;

means for storing schedule in the database when at least one of a transaction in the schedule is committed, a compensation process is stated and finished, and the schedule is dehydrated.

\* \* \* \* \*

UNITED STATES PATENT AND TRADEMARK OFFICE
CERTIFICATE OF CORRECTION

| | | |
|---|---|---|
| PATENT NO. | : 6,901,405 B1 | |
| APPLICATION NO. | : 09/741222 | |
| DATED | : May 31, 2005 | |
| INVENTOR(S) | : Donald J. McCrady et al. | |

It is certified that error appears in the above-identified patent and that said Letters Patent is hereby corrected as shown below:

In column 1, line 64, after "in the" delete "rd".

In column 6, line 37, delete "Schema Tables" and insert -- SCHEMA TABLES --, therefor.

In column 6, line 63, delete "Schema Table Fields" and insert -- SCHEMA TABLE FIELDS --, therefor.

In column 7, line 1, after "and" delete "25".

In column 7, line(s) 27-41, delete "The Module table 32 comprises ModuleID: char(36), and Module Name: varchar(100) fields. The Module table 32 further includes a primary key ModuleID. It will be noted that foreign keys in the binding and schedule tables refer to module. Message table 33 comprises fields MessageID: integer (identity); MessageName: varchar(100); and ScheduleID: char(36). The Message table 33 also comprises a primary key Message ID and a foreign key FK1 ScheduleID. CaseRule table 34 includes fields for RuleID, RuleName, and ScheduleID: char(36), with a primary key RuleID and a foreign key FK1 ScheduleID. Port table 35 includes fields PortID: integer (identity); PortName: varchar(100); and ScheduleID: char(36). The Port table 35 further includes a primary key PortID and a foreign key FK1 ScheduleID." and insert -- The Module table 32 comprises ModuleID: char(36), and Module Name: varchar(100) fields. The Module table 32 further includes a primary key ModuleID. It will be noted that foreign keys in the binding and schedule tables refer to module. Message table 33 comprises fields MessageID: integer (identity); MessageName: varchar(100); and ScheduleID: char(36). The Message table 33 also comprises a primary key Message ID and a foreign key FK1 ScheduleID. CaseRule table 34 includes fields for RuleID, RuleName, and ScheduleID: char(36), with a primary key RuleID and a foreign key FK1 ScheduleID. Port table 35 includes fields PortID: integer (identity); PortName: varchar(100); and ScheduleID: char(36). The Port table 35 further includes a primary key PortID and a foreign key FK1 ScheduleID. --, therefor, on line 28 as a new paragraph.

In column 7, line 61, delete "ProicessID" and insert -- ProcessID --, therefor.

In column 7, line 67, after "ActionID" delete "ill".

UNITED STATES PATENT AND TRADEMARK OFFICE
CERTIFICATE OF CORRECTION

| | |
|---|---|
| PATENT NO. | : 6,901,405 B1 |
| APPLICATION NO. | : 09/741222 |
| DATED | : May 31, 2005 |
| INVENTOR(S) | : Donald J. McCrady et al. |

It is certified that error appears in the above-identified patent and that said Letters Patent is hereby corrected as shown below:

In column 8, line(s) 20-35, delete "An action may be part of a sequence or task, in which case, one of the fields pSequence and pTaskID may have a value, however both of them will not. The ActionType field may have one of the following values: 'call', "source', 'sink', 'return', or release". In the Action table 44, the ActionType field may be an enum that identifies the type of action. Note that the ActionID may be the key for the tables corresponding to different types of actions. The pSequence field is a sequence id in the container sequence. The pTaskID field is the container task if it is part of the task. The ContextInvocation table 45 includes fields ActionID: integer; ContextID: integer; and IsReturn: bit; where the IsReturn field value determines whether an action is a return or release. Table 45 further includes a primary key ActionID and foreign keys FK1 ActionID and FK2 ContextID." and insert -- An action may be part of a sequence or task, in which case, one of the fields pSequence and pTaskID may have a value, however both of them will not. The ActionType field may have one of the following values: 'call', 'source', 'sink', 'return', or 'release'. In the Action table 44, the ActionType field may be an enum that identifies the type of action. Note that the ActionID may be the key for the tables corresponding to different types of actions. The pSequence field is a sequence id in the container sequence. The pTaskID field is the container task if it is part of the task. The ContextInvocation table 45 includes fields ActionID: integer; ContextID: integer; and IsReturn: bit; where the IsReturn field value determines whether an action is a return or release. Table 45 further includes a primary key ActionID and foreign keys FK1 ActionID and FK2 ContextID. --, therefor, on line 21 as a new paragraph.

In column 8, line 55, delete "MsGID" and insert -- MsgID --, therefor.

In column 9, line 48, delete "varchar(0)" and insert -- varchar(10) --, therefor.

In column 10, line(s) 7-22, delete "SwitchTbl table 63 comprises fields: ProcessID: integer; ScheduleID: char (36); ContextID: integer, (null allowed); and DefProcessID: integer, (null allowed), wherein the DefProcessID is the id of the process to be invoked if this is true. The SwitchTbl table 63 includes a primary key ProcessID and foreign keys FK1 ProcessID and FK2 ScheduleID. CaseTbl table 64 comprises fields CaseID: integer; pSwitchID: integer; MsgID1: integer; MsgID2: integer; RuleRefID: integer; and ProcessID: integer. This table 64 has a primary key CaseID, and foreign keys FK1 pSwitchID, FK2 MsgID1, Fk3 MsgID2, and FK4 RuleRefID. The CaseTbl table 64 comprises details on the non-default conditions. Copy table 65 fields include ProcessID: integer; ScheduleID: char (36); ContextID: integer, (null allowed); and cProcessID: integer. Table 65 further includes primary key ProcessID and foreign keys FK1 ScheduleID and FK2 ProcessID." and insert -- SwitchTbl table 63 comprises fields: ProcessID: integer; ScheduleID: char (36); ContextID: integer, (null allowed); and

UNITED STATES PATENT AND TRADEMARK OFFICE
CERTIFICATE OF CORRECTION

| | | |
|---|---|---|
| PATENT NO. | : 6,901,405 B1 | |
| APPLICATION NO. | : 09/741222 | |
| DATED | : May 31, 2005 | |
| INVENTOR(S) | : Donald J. McCrady et al. | |

It is certified that error appears in the above-identified patent and that said Letters Patent is hereby corrected as shown below:

DefProcessID: integer, (null allowed), wherein the DefProcessID is the id of the process to be invoked if this is true. The SwitchTbl table 63 includes a primary key ProcessID and foreign keys FK1 ProcessID and FK2 ScheduleID. CaseTbl table 64 comprises fields CaseID: integer; pSwitchID: integer; MsgID1: integer; MsgID2: integer; RuleRefID: integer; and ProcessID: integer. This table 64 has a primary key CaseID, and foreign keys FK1 pSwitchID, FK2 MsgID1, Fk3 MsgID2, and FK4 RuleRefID. The CaseTbl table 64 comprises details on the non-default conditions. Copy table 65 fields include ProcessID: integer; ScheduleID: char (36); ContextID: integer, (null allowed); and cProcessID: integer. Table 65 further includes primary key ProcessID and foreign keys FK1 ScheduleID and FK2 ProcessID. --, therefor, on line 8 as a new paragraph.

In column 10, line 47, after "fields" delete ".".

In column 11, line 15, delete "(200)" and insert -- (100) --, therefor.

In column 11, line 38, delete "Schema Table Relationships" and insert -- SCHEMA TABLE RELATIONSHIPS --, therefor.

In column 12, line 19, delete "f)" before "Port table".

In column 12, line 45, delete "FIGS. 2F" and insert -- FIG. 2F --, therefor.

In column 14, line 3, delete "COM+application name" and insert -- COM+ application name --, therefor.

In column 14, line(s) 43-44, delete "Method of Storing Process Information in a Database" and insert -- METHOD OF STORING PROCESS INFORMATION IN A DATABASE --, therefor.

In column 15, line(s) 58-59, delete "Method of Monitoring Process Information in a Database" and insert -- METHOD OF MONITORING PROCESS INFORMATION IN A DATABASE --, therefor.

In column 15, line 65, after "database schema" insert -- . --.

In column 16, line 16, delete "Exemplary Operating Environment" and insert -- EXEMPLARY OPERATING ENVIRONMENT --, therefor.

UNITED STATES PATENT AND TRADEMARK OFFICE
CERTIFICATE OF CORRECTION

PATENT NO. : 6,901,405 B1
APPLICATION NO. : 09/741222
DATED : May 31, 2005
INVENTOR(S) : Donald J. McCrady et al.

It is certified that error appears in the above-identified patent and that said Letters Patent is hereby corrected as shown below:

In column 16, line 32, delete "multi-processor" and insert -- multiprocessor --, therefor.

In column 18, line 57, in Claim 1, delete "processing" and insert -- process --, therefor.

In column 18, line 60, in Claim 1, delete "unfinished" and insert -- finished --, therefor.

In column 19, line 10, in Claim 6, after "comprises" delete "at" and insert -- the --, therefor.

In column 19, line 25, in Claim 7, after "finished" insert -- , --.

In column 19, line 39, in Claim 12, after "claim 7" insert -- , --.

In column 19, line 44, in Claim 14, after "claim 7," delete "vie".

In column 20, line 14, in Claim 19, after "binding" insert -- information --.

In column 21, line 17, in Claim 28, delete "copses" and insert -- comprises --, therefor.

In column 22, line 19, in Claim 30, after "database" delete ";" and insert -- schema; and --, therefor.

In column 22, line 20, in Claim 30, after "storing schedule" insert -- state --.

In column 22, line 22, in Claim 30, delete "stated" and insert -- started --, therefor.

Signed and Sealed this

Twenty-ninth Day of September, 2009

David J. Kappos
*Director of the United States Patent and Trademark Office*